Dec. 6, 1927.  1,651,675
W. A. COOK
REVERSIBLE CLUTCH
Filed Oct. 19, 1923  3 Sheets-Sheet 1

W. A. Cook, Inventor.

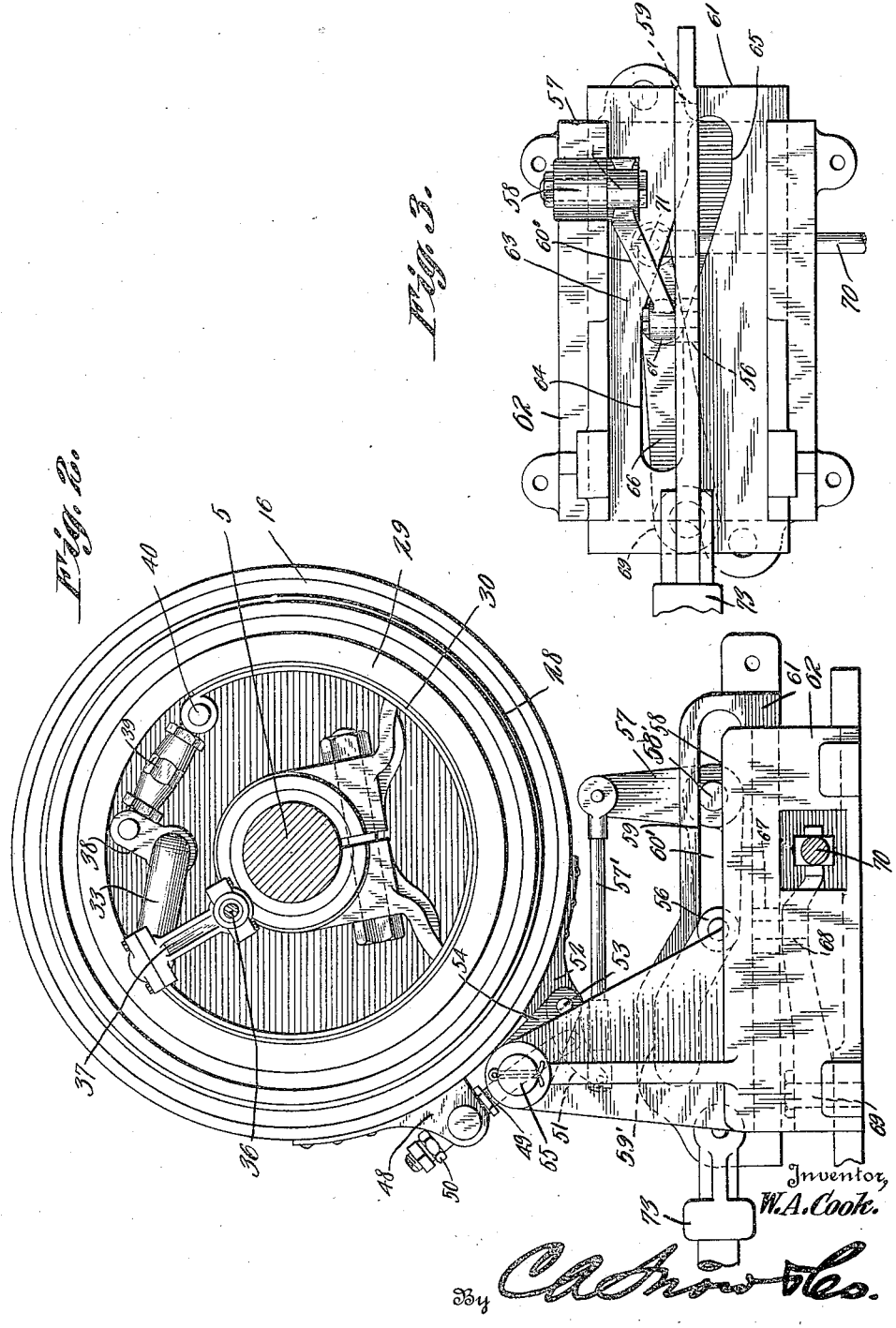

Dec. 6, 1927.
W. A. COOK
1,651,675
REVERSIBLE CLUTCH
Filed Oct. 19, 1923
3 Sheets-Sheet 3
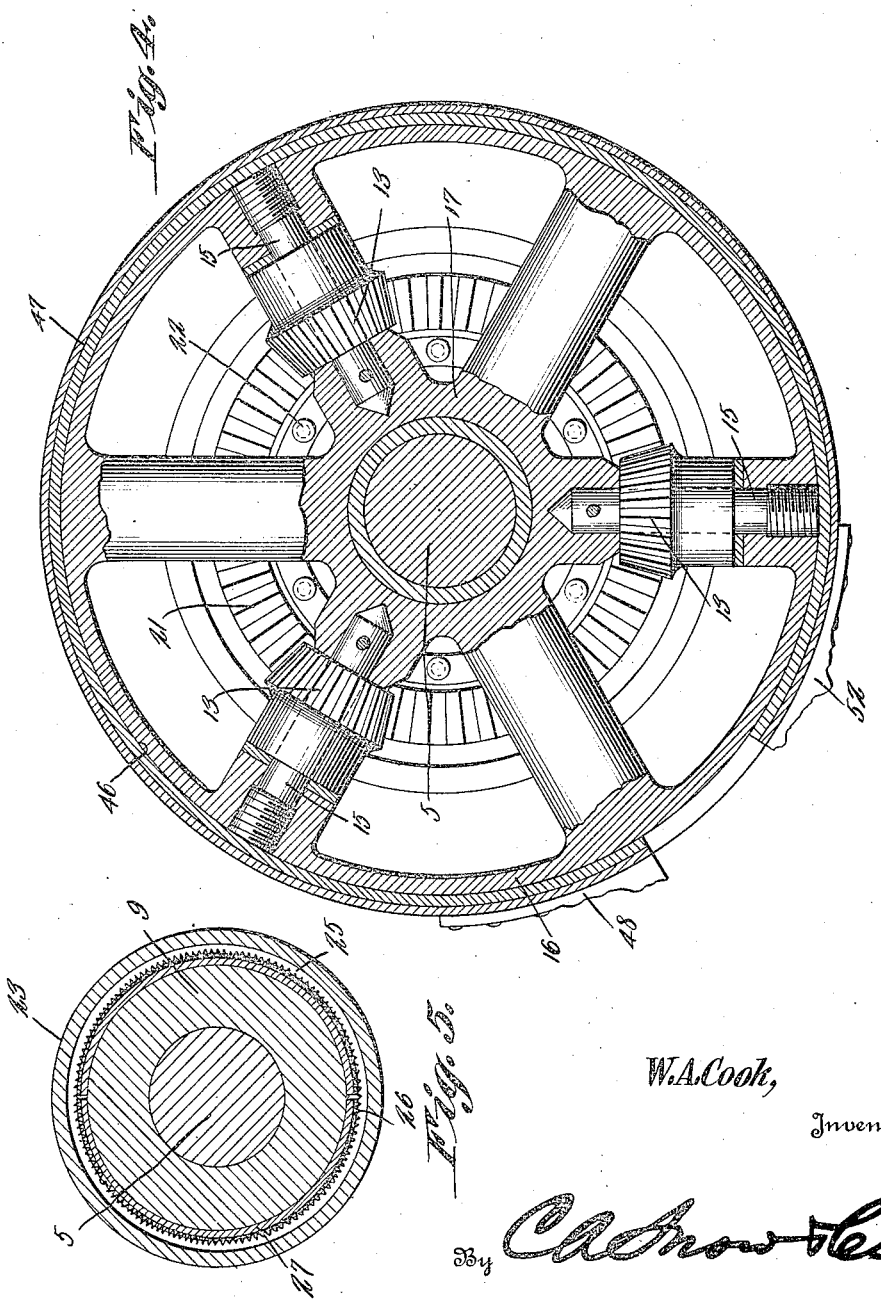
W.A.Cook,
Inventor.
Attorneys.

Patented Dec. 6, 1927.

1,651,675

UNITED STATES PATENT OFFICE.

WILLIAM A. COOK, OF MARION, INDIANA, ASSIGNOR TO THE MARION MACHINE, FOUNDRY AND SUPPLY COMPANY, OF MARION, INDIANA, A CORPORATION.

REVERSIBLE CLUTCH.

Application filed October 19, 1923. Serial No. 669,566.

This invention relates to power devices and more particularly to a transmission structure especially designed for transmitting power from a drive shaft to a driven shaft.

The primary object of the invention is to provide novel means for reversing the direction of rotation of the driven shaft in such a manner as to eliminate the necessity of stopping the power device in order to accomplish the reversing of the driven shaft.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 2 is a sectional view taken on line 2—2 of Figure 1.

Figure 3 is a plan view of the brake controlling carriage.

Figure 4 is a sectional view taken on line 4—4 of Figure 1.

Figure 5 is a sectional view taken on line 5—5 of Figure 1.

Figure 1:
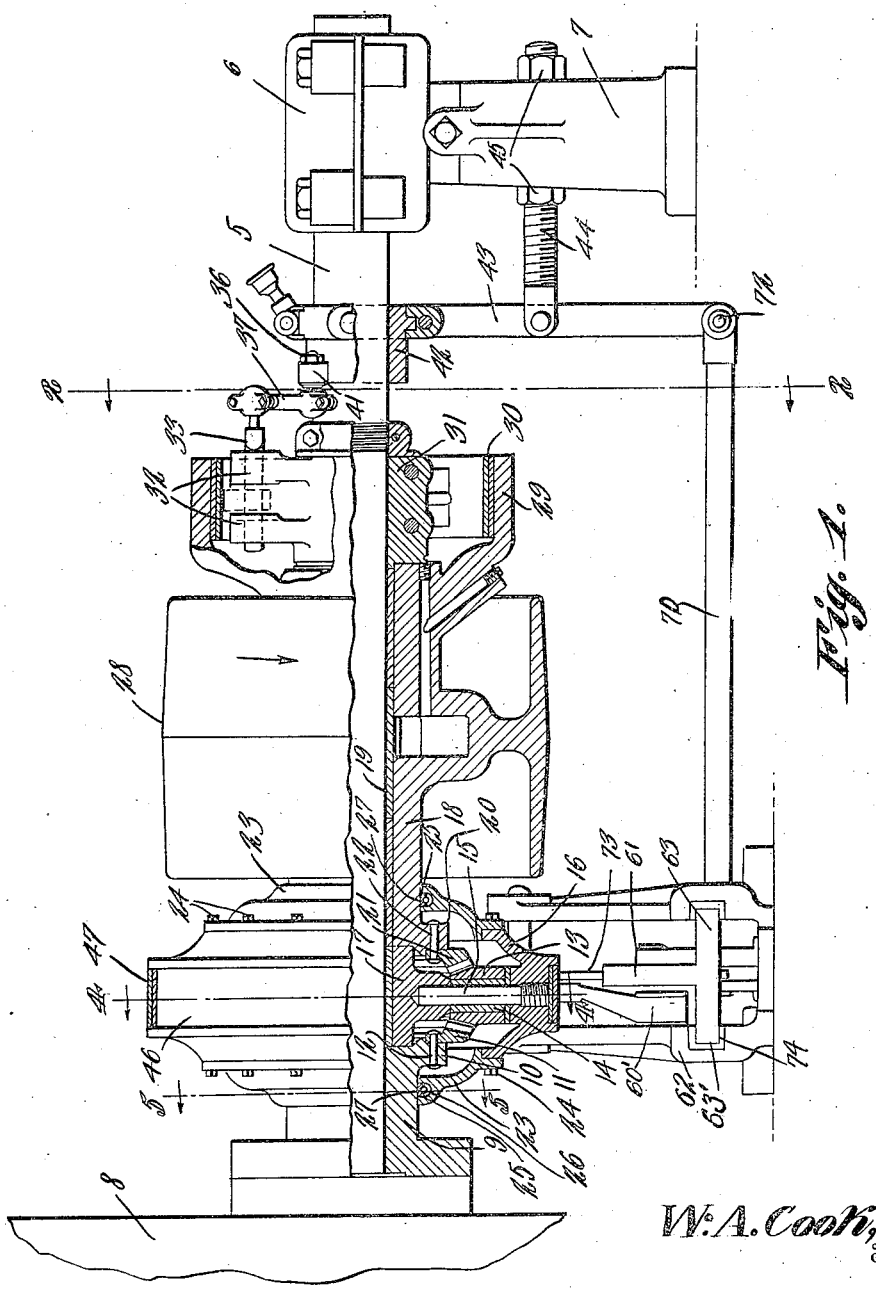
Figure 1 is a side elevational view of a power device constructed in accordance with the invention, parts thereof being shown in section.

Referring to the drawings in detail, the reference character 5 designates the supporting shaft of the power device which is mounted in bearings 6 disposed in the upper end of the support 7, the opposite end of the shaft being mounted in a suitable support not shown.

The motor or power element, forms no part of the present invention, however a portion of the power element is shown, and indicated by the reference character 8, the same being keyed to the shaft 5 to cause the shaft to rotate with the power element.

The shaft 9 is formed with a flange 10 to which the ring gear 11 is secured by means of the bolts 12, the ring gear being designed to mesh with the teeth of the beveled pinions 13, which operate on the bearings 14 carried by shafts 15. These shafts 15 are mounted in suitable openings in the housing 16 and are arranged at predetermined distances apart, the inner ends of the shafts being mounted in openings formed in the bearing 17. The driven shaft is indicated at 18 and is also mounted on the bearings 19 that are positioned on the shaft 5, the driven shaft being provided with a flange 20 at one end thereof to support the ring gear 21, the ring gear being secured by means of bolts 22.

The teeth of the ring gear 21 also cooperate with the teeth of the pinions 13 so that movement of the hollow shaft 9 may be directed to the shaft 18, through the pinions 13 and ring gears associated therewith.

Forming a part of the housing 16 are lateral plates 23 that are bolted to the housing section 16 by means of bolts 24. Formed in each of the plates 23 is a groove 25 which grooves accommodate spring members 26 that exert a constant pressure on the packing members 27 that contact with the shaft associated therewith to provide a fluid-tight connection between the housing and shafts permitting the pinions 13 and ring gears 11 and 21 to operate submerged in oil.

Supported on the drive shaft 18 is a pulley 28 over which may operate a suitable belt not shown, for taking off power from the drive shaft and as shown, this pulley is formed with clutch flange 29 against which the clutch band 30 moves to rotate the pulley 28 with the drive shaft. The clutch band 30 is supported by sleeve 31 keyed to shaft 5, the sleeve being formed with enlargements 32 that have openings to accommodate the crank arm 33, which has a universal movement with respect to the shaft 36 by means of the ball and socket joint 37 so that movement of the shaft 36 will result in a relative movement of the crank arm 33.

Secured to the crank arm 33 is a relatively short arm 38 that connects with the turn buckle 39 which in turn has connection with one end of the clutch band 30 as at 40.

The shaft 36 extends through a lug 41 formed on the movable sleeve 42, which movable sleeve is controlled by the movement of the rocker arm 43 which is pivotally supported by means of the threaded rod 44 that extends through the support 7 and secured thereto by means of the nuts 45. Thus it will be seen that by adjusting the nuts 45 the movement of the arm 43 may be regulated. A recessed portion 46 is formed exteriorly of the housing 16 and is of a width to receive the brake band 47 that has ears 48 extending therefrom.

Extending through the ears 48 is a threaded shaft 49 that is adjustably supported by means of the nut 50 whereby the length of the shaft 49 may be regulated to adjust the brake bands within the recessed portion 46. One end of the shaft 49 has connection with the lever 51 that has pivotal connection with the lug 52 formed at the opposite end of the brake band, through the shaft 53, the shaft 53 also providing a support for the arm 54 mounted on one end of the shaft 55 that anchors one end of the brake band against movement.

Connected with one end of the link 51 is a connecting rod 57' which is connected to the bell crank lever 57 mounted on shaft 58' that is supported in the bearing 58 extending upwardly from the supporting member 62. The arm 60' of the bell crank lever 57 carries a roller 56 at its free end, which roller also moves in the opening 59.

The opening 59 is formed with an offset portion 59' to cause the bell crank lever to rock, when the carriage 61 is moved longitudinally of the support 62 whereupon the connecting rod 57' is moved, which in turn moves the lever 51 causing the brake band 47 to closely engage the housing.

The carriage 61 includes a plate 63 having its side edges mounted in the guideways 63' of the support 62, which plate is also provided with an elongated opening 64 having an offset portion 65 designed to move the arm 66 when the roller 67 mounted on shaft 68 and carried by the arm 66, moves throughout the length of the elongated opening 64.

The arm 66 is pivotally supported under the carriage 61 at 69, and has its forward end connected with the operating rod 70 at 71. As clearly shown by Figure 1 of the drawings, this rod 70 has connection with the arm 43 at 72, to rock the arm 43.

Connected with the carriage 61 is a controlling rod 73, which, when moved by the operator operates to actuate the brake bands. The plate 63 has its side edges mounted in the groves 74 as clearly shown by Figure 1 of the drawings, whereby the plate may move freely upon the operation of the rod 73.

The operation of the device is as follows:

Assuming that the pulley 28 is moving in the direction of the arrow in Figure 1 of the drawings, it is obvious that the drive is direct through the ring gear 11, pinions 13, ring gear 21 to the shaft 18 of which the pulley forms a part. While the gearing is operating as described, it is obvious that the housing 16 is stopped, the clutch bands having been operated to closely engage the housing. Should it be desired to reverse the direction of rotation of the pulley 28, the rod 73 is forced outwardly by a lever not shown, whereupon the roller 56 moves in the straight portion of the elongated opening 59, holding the bell crank lever and shaft 57 or 57' against movement.

Simultaneously with the movement of the carriage 61, the roller 67 moves in the opening 64 formed in the plate 63 resulting in a transverse movement of the operating rod 70 which in turn operates the arm 43 to move the collar 42 which in turn has connection with the clutch band 30 through the crank arm 33, thereby operating the clutch band associated therewith to cause rotation of the pulley in the same direction as the rotation of the shaft 5.

While the housing 16 is held by the brake band 47, it is obvious that the rotation of the shaft 9 rotates the pinions 13 on their shafts, which in turn rotate the ring gear 21 in a direction opposite to the direction of rotation of the ring gear 11 supported at the inner end of the shaft 9.

What is claimed as new is:—

1. In a device of the character described, a rotatable housing, a brake band associated with the housing to restrict movement of the housing, a shaft on which the rotatable housing operates, a sliding plate operating under the housing and having an elongated opening formed with offset end portions, an upstanding member extending throughout the length of the plate and forming a part of the slide, said upstanding member having an elongated opening formed with an upwardly disposed end portion, a bell crank lever pivotally supported adjacent to the housing, and having a roller on one end thereof adapted to move in the second mentioned elongated opening, the opposite end of the bell crank lever having connection with the brake band to operate the brake band when the plate is moved, and a clutch operating member operating in the first mentioned elongated opening, and a clutch operated by the clutch operating member, said clutch being operated simultaneously with the action of the brake.

2. In a device of the character described, a rotatable housing, a brake band associated with the housing to restrict movement of the housing, a shaft on which the rotatable housing operates, a sliding plate operating under the housing, means connected with the brake band and operated by movement of the plate for moving the brake band into and out of operation, a clutch mechanism, a rod for operating the clutch mechanism, said rod extending at right angles to the line of movement of the plate, means for connecting the plate and rod, and said plate adapted to operate to move the rod laterally when the plate is moved to operate the brake band.

In testimony that I claim the foregoing as my own, I have hereto affixed my signature.

WILLIAM A. COOK.